(12) United States Patent
Sutton

(10) Patent No.: US 11,022,220 B2
(45) Date of Patent: *Jun. 1, 2021

(54) ROTARY SEAL APPARATUS, COVER AND METHOD

(71) Applicant: Shawn Robert Sutton, Houston, PA (US)

(72) Inventor: Shawn Robert Sutton, Houston, PA (US)

(73) Assignee: Sutton Industrial Products LLC, Houston, PA (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/234,036

(22) Filed: Dec. 27, 2018

(65) Prior Publication Data

US 2019/0128425 A1  May 2, 2019

Related U.S. Application Data

(63) Continuation of application No. 15/474,553, filed on Mar. 30, 2017, now Pat. No. 10,167,955.

(51) Int. Cl.
*F16J 15/3268* (2016.01)
*F16J 15/34* (2006.01)
*F16J 15/3204* (2016.01)

(52) U.S. Cl.
CPC ....... *F16J 15/3268* (2013.01); *F16J 15/3204* (2013.01); *F16J 15/344* (2013.01); *F16J 15/3464* (2013.01)

(58) Field of Classification Search
CPC ...... F16J 15/3268; F16J 15/3272; F16J 15/32; F16J 15/3204; F16J 15/3208; F16J 15/344; F16J 15/3464; F16J 15/3468

USPC .......................................................... 277/309
See application file for complete search history.

(56) References Cited

U.S. PATENT DOCUMENTS

| | | | | |
|---|---|---|---|---|
| 4,405,137 A * | 9/1983 | Webb | ....................... | F16J 15/34 277/553 |
| 4,961,588 A * | 10/1990 | Brienza | ............... | F16J 15/3204 277/545 |
| 5,571,269 A * | 11/1996 | Buelow | ..................... | F27B 7/24 277/545 |
| 5,632,493 A * | 5/1997 | Gardner | .................. | F16J 15/48 277/411 |
| 6,558,262 B1* | 5/2003 | Breidenbach | ........... | F16D 3/845 277/636 |
| 6,589,049 B1* | 7/2003 | Sutton | ....................... | F27B 7/24 277/358 |
| 2009/0140097 A1* | 6/2009 | Collier | ..................... | B32B 5/18 244/121 |
| 2014/0097572 A1* | 4/2014 | Hatch | .................. | F16J 15/3232 277/353 |
| 2014/0154053 A1* | 6/2014 | Roberts | .................. | F01D 11/00 415/121.3 |

* cited by examiner

*Primary Examiner* — Nathan Cumar
(74) *Attorney, Agent, or Firm* — Ansel M. Schwartz

(57) ABSTRACT

A rotary seal apparatus for a rotating drum includes a mounting ring. The apparatus includes seal flaps attached to the ring. The apparatus includes wear pads attached to the seal flaps having a wear side and an exposed side. The apparatus includes eye nuts extending upwards from the seal flaps and from the wear pads. The apparatus includes a first tensioner extending through the eye nuts. The apparatus includes a cover that is disposed over the seal flaps and the exposed side of the wear pads. A method for forming a rotary seal apparatus for a rotating drum.

9 Claims, 9 Drawing Sheets

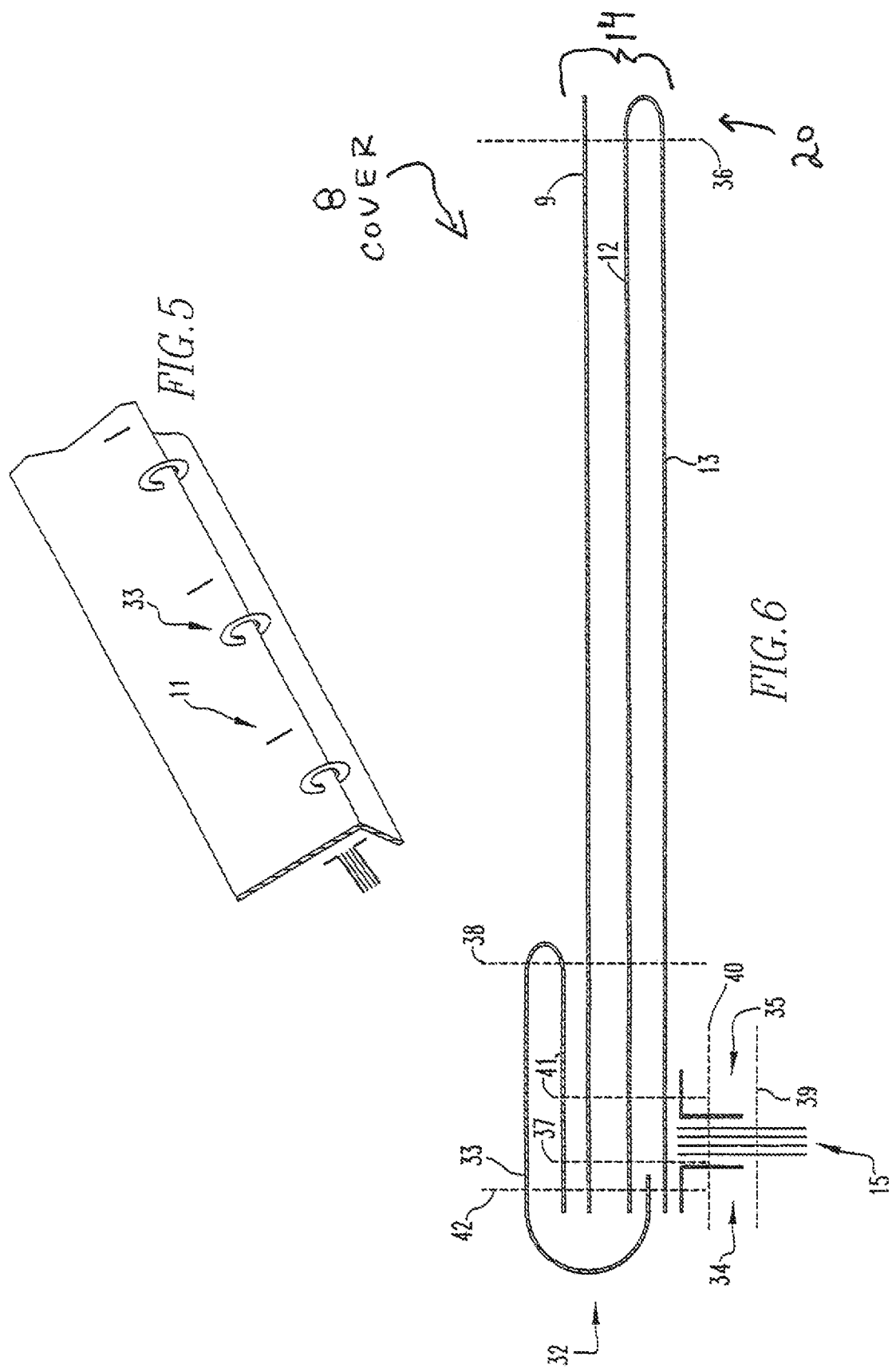

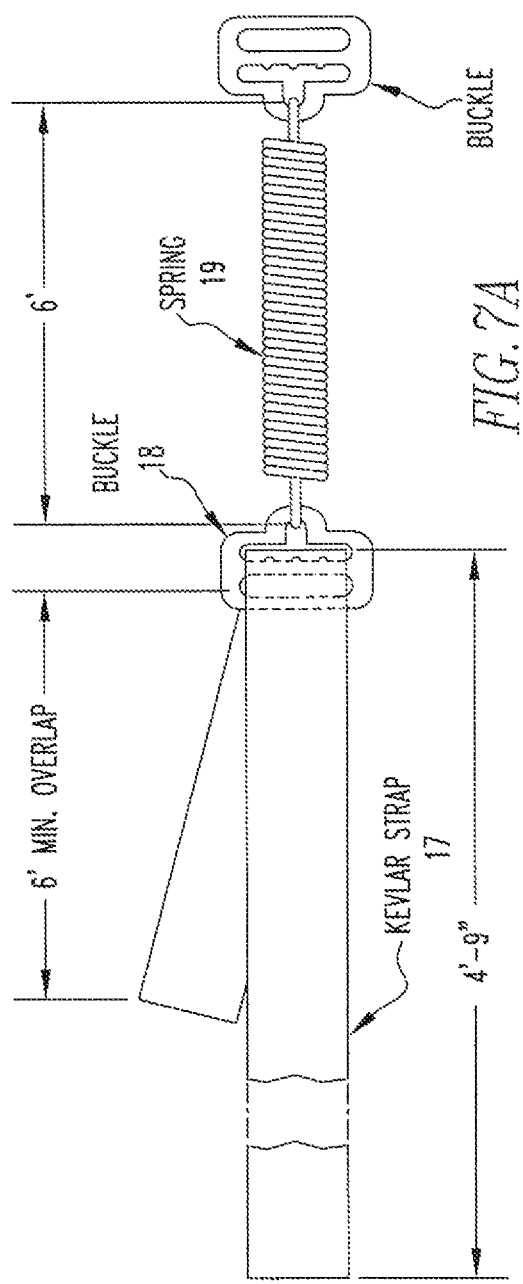
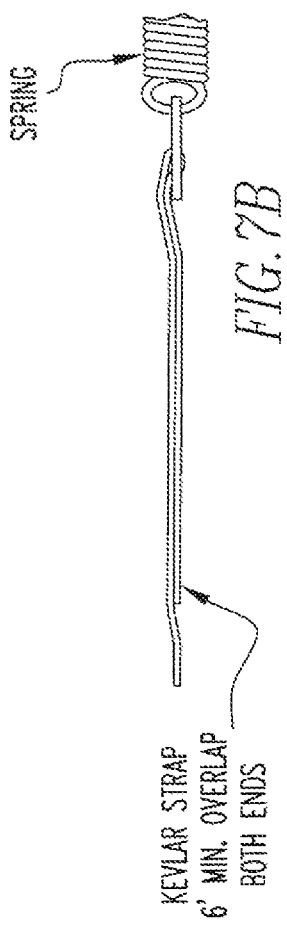

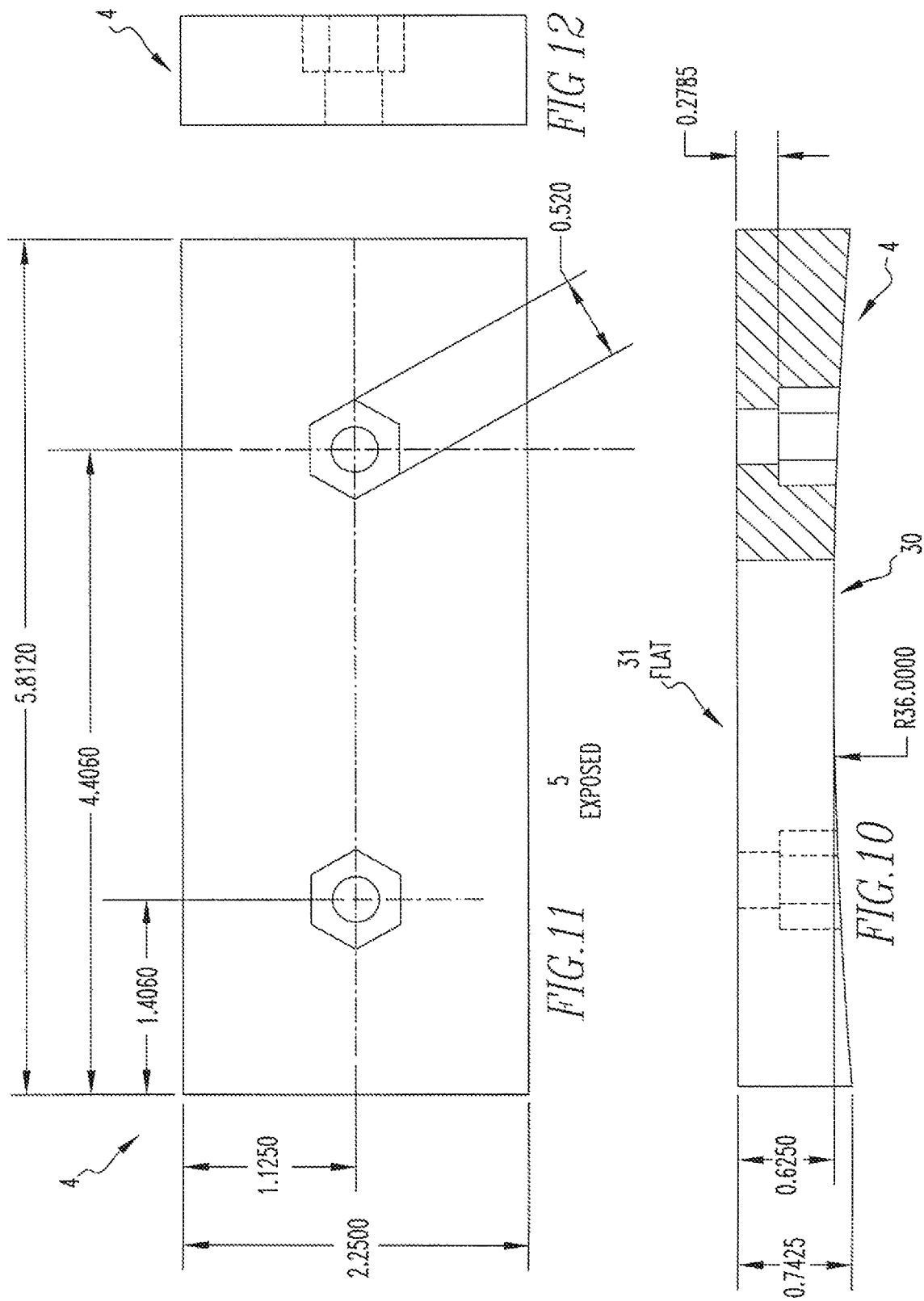

ROTARY SEAL APPARATUS, COVER AND METHOD

CROSS-REFERENCE TO RELATED APPLICATIONS

This is a continuation of U.S. patent application Ser. No. 15/474,553 filed on Mar. 30, 2017, now U.S. Pat. No. 10,167,955, incorporated by reference herein.

FIELD OF THE INVENTION

The present invention is related to a cover for a rotary seal that is positioned, over plate flaps and the exposed side of wear pads. (As used herein, references to the "present invention" or "invention" relate to exemplary embodiments and not necessarily to every embodiment encompassed by the appended claims.) More specifically, the present invention is related to a cover for a rotary seal and is positioned over plate flaps in the exposed side of wear pads that is held in place by a belt.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be mead in this light, and not as admissions of prior art.

Rotary drums are designed and manufactured in varying diameters in response to throughput, materials, temperature, and a variety of other engineering parameters. To accommodate the varying diameter drums, varying diameter cod housings must be designed to allow the drums to penetrate the end housings with a minimal gap as to accommodate future eccentricity, or out of roundness of the drum.

To seal this gap, one such method, like U.S. Pat. No. 5,571,269 (Buelow) and U.S. Pat. No. 4,405,137 (Webb), is to have a framework of overlapping seal flaps which are formed to an angle such that one edge of the seal flap 6 is clamped tightly to an annular ring which is affixed securely to the stationary end housing. The annular ring typically has mounting studs welded into the conical section of the ring which are used to affix the seal flaps through mounting holes adjacent a mounting edge of the seal flap. Past designs of this flap provided for a round mounting hole and slotted mounting hole. The slotted mounting hole has allowed for a sealing assembly with a fixed number of seal flaps to accommodate a small range of drum diameters before having to add or subtract a seal flap from a total number of seal flaps needed to make a seal. For instance, a 100-inch outer diameter drum would require 50 seal flaps to affect a proper seal. The slotted mounting hole would increase, the range of diameter from just 100 inches specifically, to 98-102 inches. The slotted mounting hole allows for some standardization in seal flap design such that it accommodates a shorter or longer chord length between the mounting studs in the annular ring. Standard sized seal flaps can be made to fit a varying range of drum diameters by simply adding or subtracting several seal flaps to accommodate 360-degree coverage of the rotating drum.

The seal flaps have been further standardized into 4 different size seal flaps to accommodate drum diameters as small as 2 feet, and as large as 20+ feet. With each size of seal flap, the leading mounting hole has traditionally been round. The issue with this, that this invention addresses, is that the round hole limits the range of diameters that each of the seal flaps can be used. By traditional design, the top edge of the seal flap is not in parallel with the wear shoe edge of the seal flap to accommodate how the seal flaps are mounted. Since the seal flaps are swept in design, the tangential line from where the wear shoe would contact the rotating drum is not in parallel with the tangential line from where the clamping edge of the seal flap mounts to the annular ring. As the tapered top edge of the seal flap addresses mounting, the round mounting hole limits the range of diameters that a given seal flap can effectively mount to. For instance, a smaller size seal flap is needed due to space constraints on the sealing surface of the rotating drum where a seal is to be mounted. Since the degree of taper is fixed on the mounting edge of the seal flap, it may not accommodate a much flatter profile of a larger drum having the tangential lines of the sealing surface and annular mounting rings being much closer to parallel than what a smaller diameter drum might have for which the smaller seal flap was originally designed. The distance between the mounting hole and a wear pad hole are fixed for a seal flap, and as the tangential lines between the sealing surface and mounting studs become more parallel, the stud placement for the mounting hole drops toward the wear pad hole, which causes excess material to become available along the interior edge and creates a bulge in the seal flap between the mounting hole and the wear shoe. This opening of the overlap joint greatly reduces the efficiency of the sealing arrangement.

Wear shoes are affixed by typical nuts and bolts hardware to the other edge from the mounting edge of the seal flap that contact the rotating drum at the sealing surface. Wear shoe holes are used for affixing the wear shoe to the seal flap. Seal flaps, each having an affixed wear shoe at the end, are overlapped such that the wear shoes are abutted together. A slotted hole 26 adjacent the sealing edge and the wear shoe hole 27 is used for overlapping the seal flaps together and is positioned over a wear shoe hole. This slotted hole 26 has been traditionally slotted to accommodate seal flap movement in response to eccentricity in the rotating drum as it ages and becomes oval or out of round.

The wear shoes are held in contact with the rotating drum by 1; the tension of the seal flap springing back toward the drum surface due to flexure and 2; a tension cable assembly (consisting of a cable, loop thimbles, cable, clamps, extension springs, and cable binders) which are laced through eye nuts that help affix the wear shoes to the seal flaps. The seal flaps are overlapped around the rotating drum whereas edge 25 is tucked underneath edge 28 in the seal flaps to provide complete coverage of the open gap between the end housing and drum.

This sort of arrangement, like U.S. Pat. No. 5,571,269 (Buelow), and U.S. Pat. No. 4,405,137 (Webb), traditionally uses a steel sintered wear shoe to prevent the edge 23 of the seal flap from scoring the sealing surface of the rotating drum. The wear shoes are abutted together with small inherent gaps between the abutments. These wear shoes are very heavy and prior to installing the tension cable, may cause the sealing segments to sag away from the bottom portion of the drum as the weight of the sintered shoes overcome the tension provided by the seal flaps. Thus, extra tension is required by the tensioning device to pull up the bottom part of the seal to contact the drum sealing surface. As the bottom of the seal is only making the necessary contact with the sealing surface, the top and sides of the seal now have extra undue force pushing the wear shoes into the sealing surface. Essentially the top and sides of the seal are now supporting the weight of the sintered wear shoes at the bottom of the seal. This extra tension and weight results in a shorter lifespan for the wear segments of the seal.

As equipment and seals age, they inevitably become more out of round which causes gaps to open between segments of any type of overlapping sealing system. As the rotating drum runs in and out from a true rotational axis, the sealing segments must conform to the movement of the drum. Overlapping seal flaps, and inevitably the wear shoes must expand as the drum runs out. This opens gaps between overlapping seal flap segments and between the abutting wear shoes. These open gaps cause seal efficiency to drop.

BRIEF SUMMARY OF THE INVENTION

One of the features of this invention addresses this issue by slotting a hole to accommodate a much wider range of tangential angles between the sealing surface and mounting edge.

Another feature of this invention involves replacing the heavy sintered metal wear shoes with lightweight hard compressed carbon wear pads comprised of 100% graphite.

Another feature of this invention is that although the bottom sealing edge of the 100% graphite pad is contoured to fit the curvature of the drum's sealing surface, the top edge of the wear pad is flat.

Another feature of this invention includes the addition of a cover which encapsulates not only, the overlapping seal flaps, but also the exposed edge of the wear pads.

The present invention pertains to a rotary seal apparatus for a rotating drum. The apparatus comprises a mounting ring. The apparatus comprises seal flaps attached to the ring. The apparatus comprises eye nuts extending upwards from the seal flaps and from the wear pads. The apparatus comprises wear pads attached to the seal flaps having a wear sick and an exposed side. The apparatus comprises a first tensioner extending through the eye nuts. The apparatus comprises a cover that is disposed over the seal flaps and the exposed side of the wear pads.

The present invention pertains to a method for forming a rotary seal apparatus for a rotating drum. The method comprises the steps of placing a cover over seal flaps and an exposed side of wear pads. The wear pads attached to the seal flaps. The wear pads having a wear side and an exposed side. The seal flaps attached to a mounting ring. There are eye nuts extending upwards from the seal flaps and from the wear pads. There is the step of positioning a first tensioner extending through the eye nuts.

The present invention pertains to a rotary seal apparatus for a rotating shell drum. The apparatus comprises a mounting ring. The apparatus comprises wear pads made of 100% graphite attached to the seal flaps having a wear side, a top side opposing the wear side, and an exposed side connected to the wear sick and the top side. The wear side is curved and the top side is flat. The apparatus comprises seal flaps attached to the ring. The apparatus comprises eye nuts extending upwards from the seal flaps and from the wear pads. The apparatus comprises a first tensioner extending through the eye nuts.

The present invention pertains to a rotary seal apparatus for a rotating drum. The apparatus comprises a mounting ring. The apparatus comprises seal flaps attached to the ring. Each of the seal flaps have a first elongate slot and a second elongate slot that are used to attached the seal flaps to the mounting ring. The apparatus comprises wear pads attached to the seal flaps. The apparatus comprises eye nuts extending upwards from the seal flaps, and from the wear pads. The apparatus comprises a first tensioner extending through the eye nuts about the ring.

The present invention pertains to a cover for a rotary seat apparatus having seal flaps, eye nuts that extend up from the seal flaps and wear pads disposed under the seal flaps with an exposed side. The cover comprises a wide flat panel adapted to be positioned over the seal flaps having slits through which the eye nuts extend. The cover comprises belt loops attached to a top face of the wide flat panel and extending upwards horn the wide flat panel. The cover comprises, a strip attached to a bottom face of the wide flat panel and extending down from the bottom face, the panel and the strip formed of multiple layers.

BRIEF DESCRIPTION OF THE SEVERAL VIEWS OF THE DRAWING

In the accompanying drawings, the preferred embodiment of the invention and preferred methods of practicing the invention are illustrated in which:

FIG. 5 is a perspective view of a cover of the present invention.

FIG. 6 is a cross-sectional view of the cover.

FIG. 7A is an overhead view of a portion of a second tensioner.

FIG. 7B is aside view of portion of the second tensioner.

FIG. 10 is an overhead view of a representation of a wear pad of the present invention.

FIG. 11 is a side view of the wear pad.

FIG. 12 an end view of the wear pad.

DETAILED DESCRIPTION OF THE INVENTION

Figure 1:
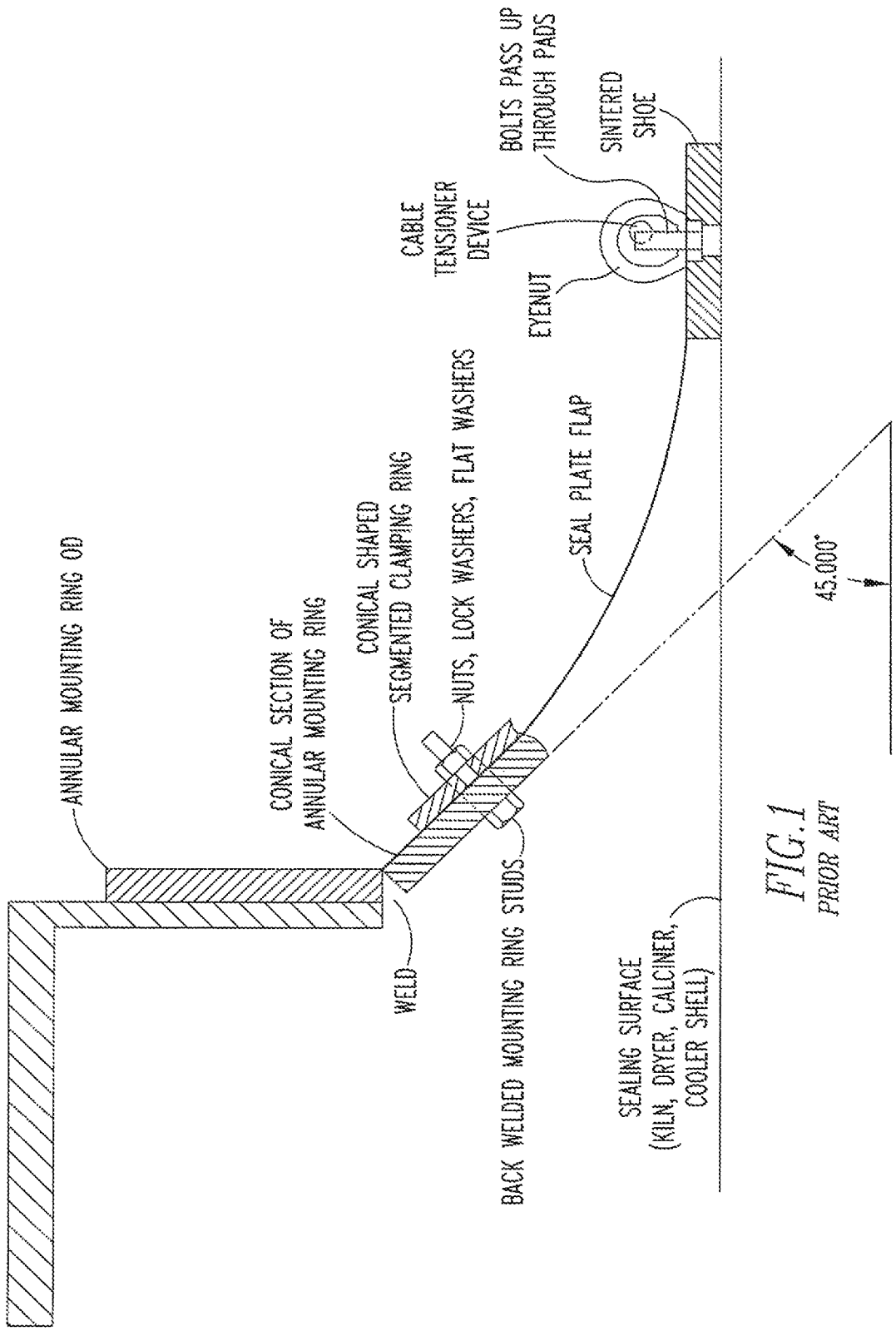
FIG. 1 is a cross-sectional representation of a prior art rotary seal apparatus.
Figure 2:
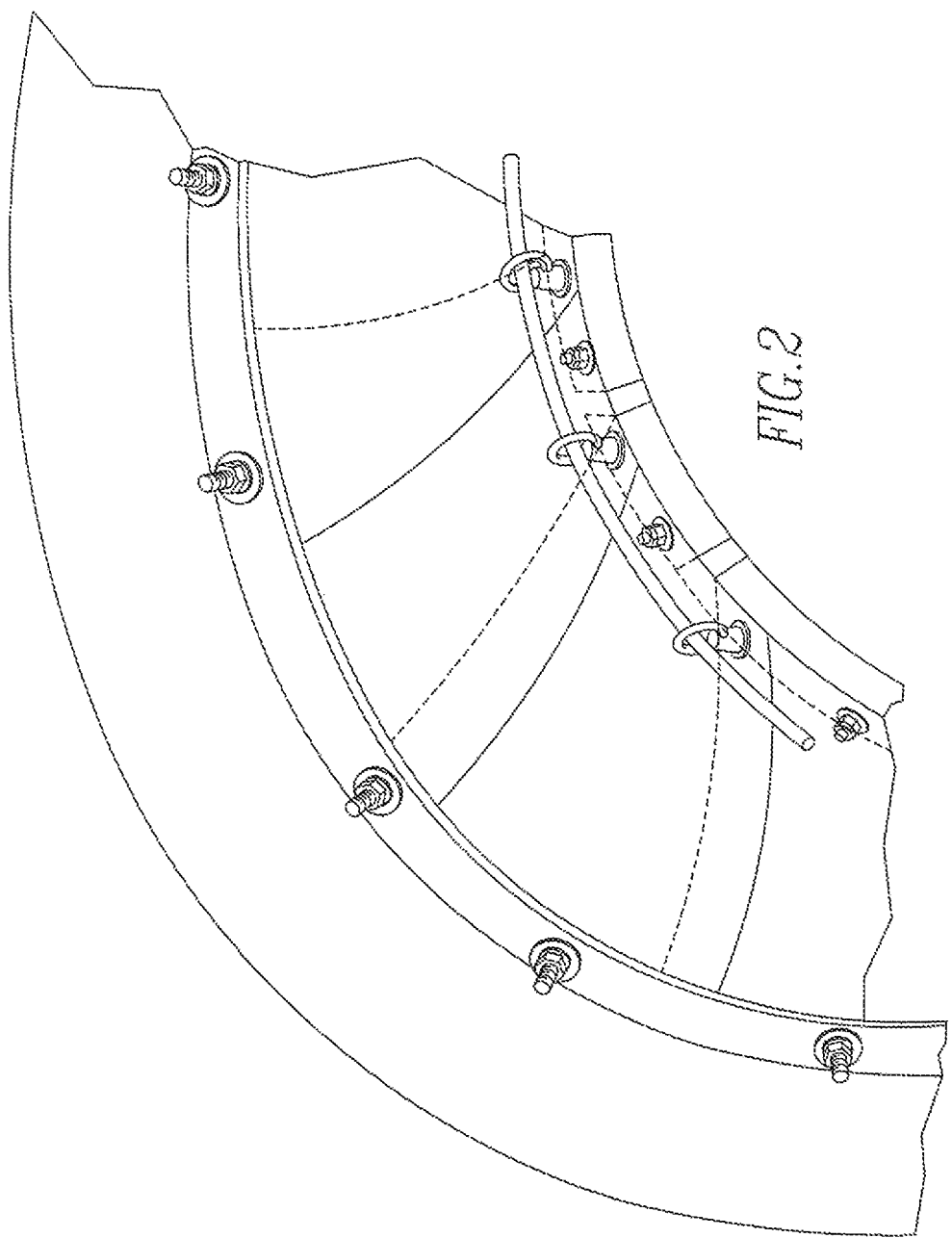
FIG. 2 is a perspective representation of a portion prior art rotary seal apparatus.
Figure 3:
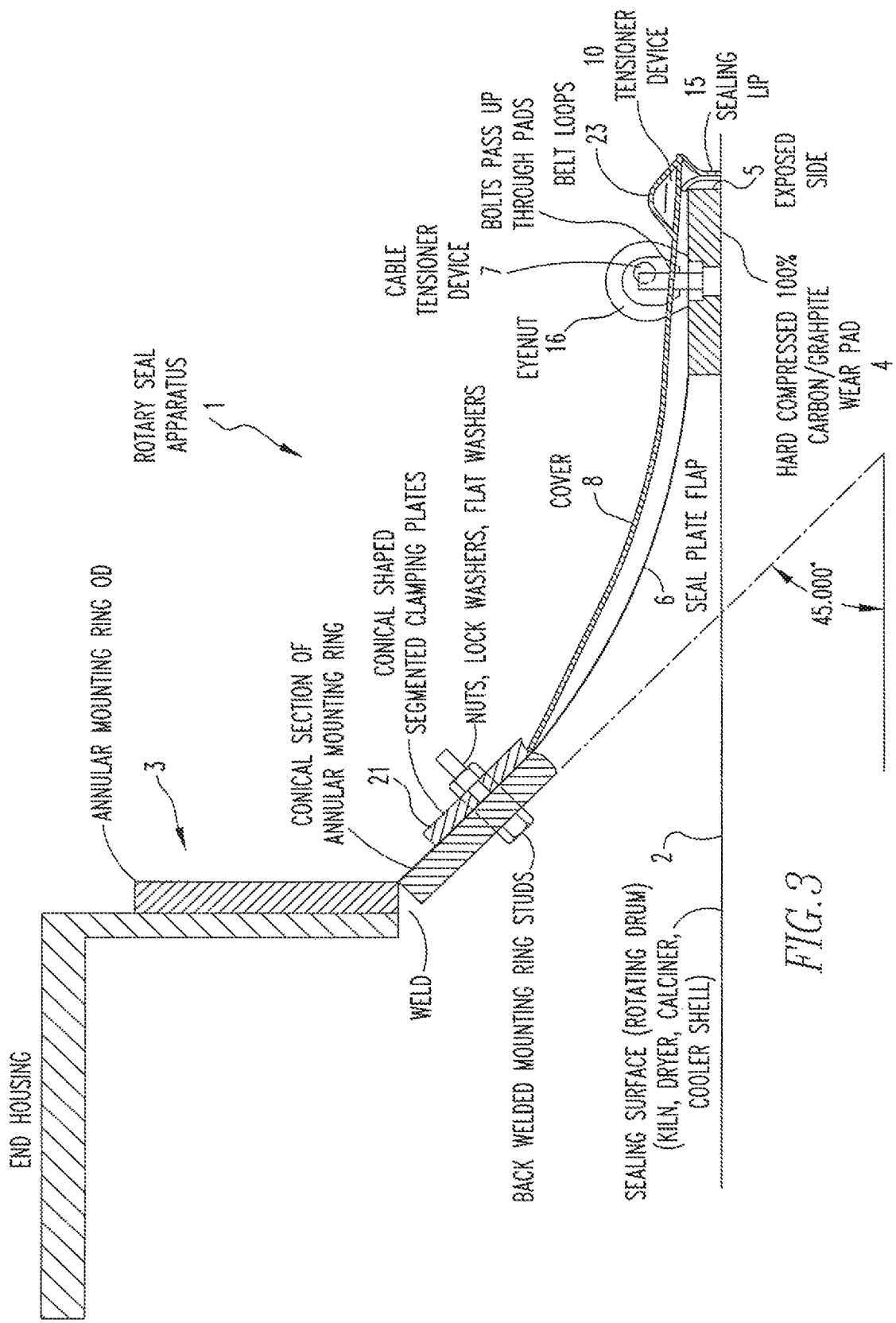
FIG. 3 is a cross-sectional representation of a portion of a rotary seal apparatus of the present invention.
Figure 4:
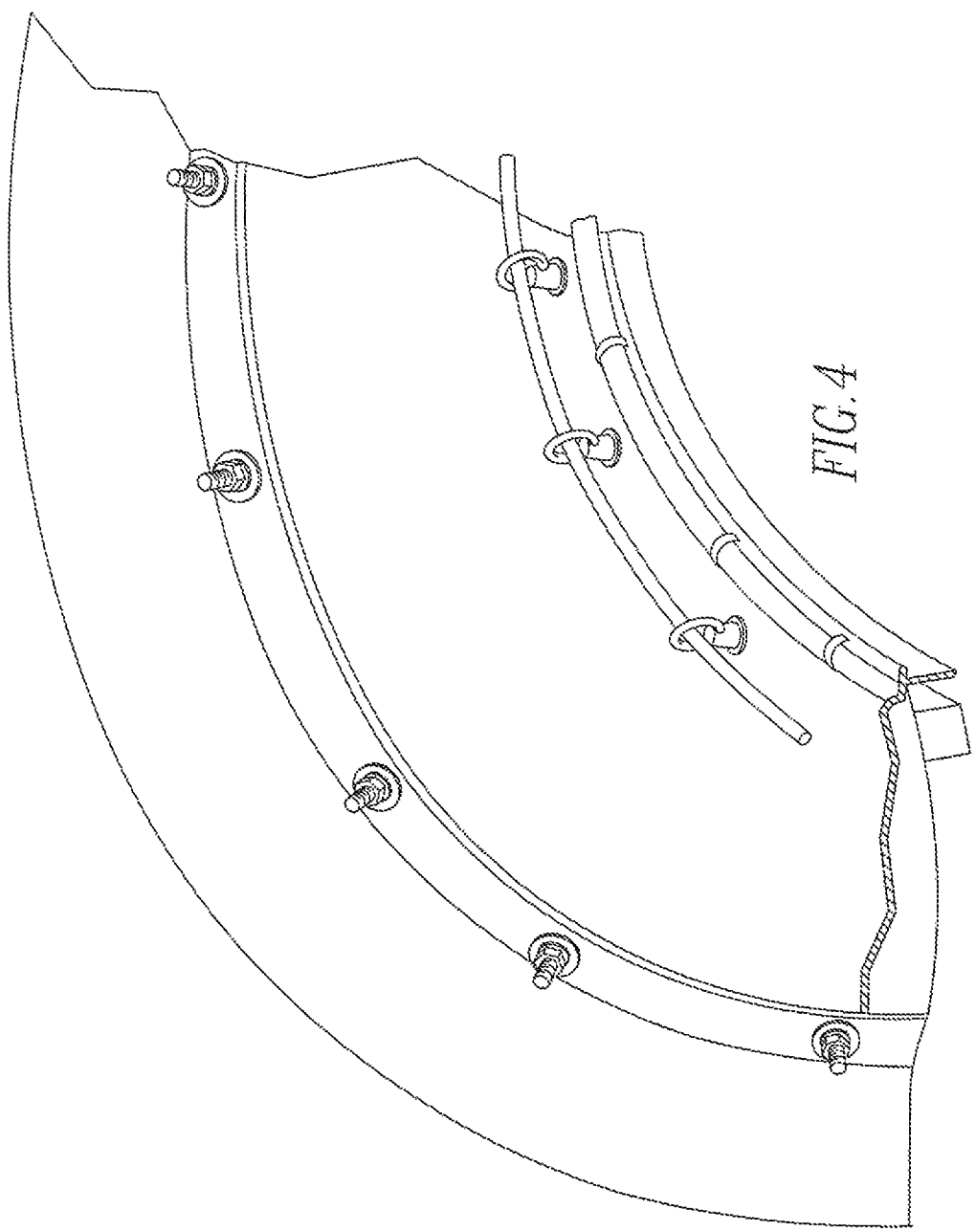
FIG. 4 is a perspective representation of a portion of the rotary seal apparatus of the present invention.
Figure 9:
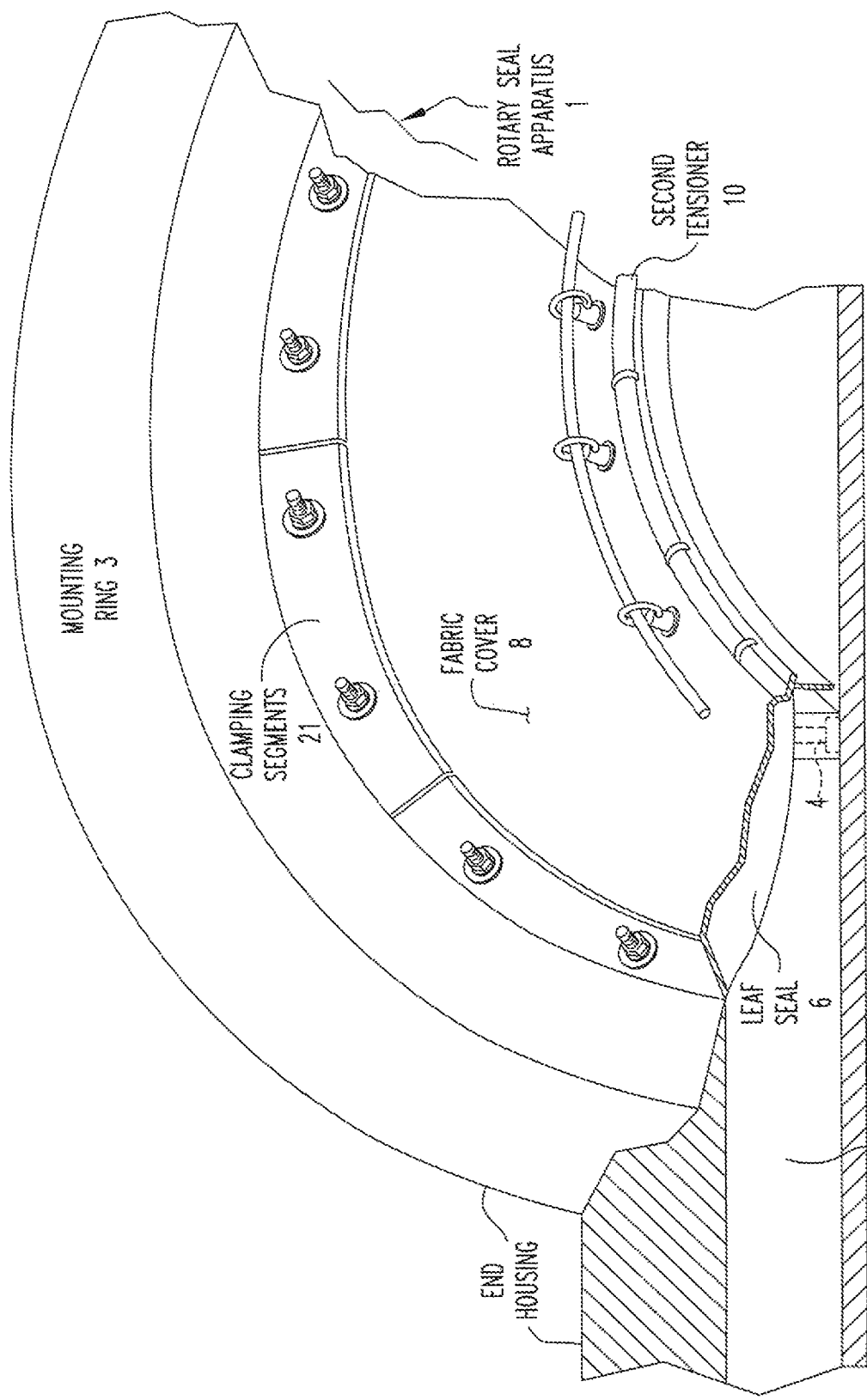
FIG. 9 is a representation of a perspective view of a portion of the rotary seal apparatus with the rotary drum of the present invention.

Referring now to the drawings wherein like reference numerals refer to similar or identical parts throughout the several views, and more specifically to FIGS. 3, 4 and 9 thereof, there is shown a rotary seal apparatus 1 for a rotating drum 2. The apparatus 1 comprises a mounting ring 3. The apparatus 1 comprises seal flaps 6 attached to the ring 3. The apparatus comprises wear pads 4 attached to the seal flaps 6 having a wear side and an exposed side 5. The apparatus 1 comprises eye nuts 16 extending upwards from the seal flaps 6 and from the wear pads 4. The apparatus 1 comprises a first tensioner 7 extending through the eye nuts 16 about the drum 2. The apparatus 1 comprises a cover 8 that is disposed on the outer side of the ring 3 over the seal flaps 6 and the exposed side 5 of the wear pads 4.

The cover 8 may have belt loop guides 33 disposed on the cover's outer surface 9, and including a second tensioner 10 that extends through the belt loop guides 33 to hold the cover 8 in place against the seal flaps 6. As shown in FIGS. 5 and 6 the cover 8 may have slits 11 through which the eye nuts 16 extend. The wear pads 4 are made of carbon/graphite. The cover 8 may withstand temperatures of at least 1000 degrees F.

The cover 8 may be flexible so the cover 8 can bend and includes three layers, an outside layer 9 which provides a vapor barrier for the cover 8, and a middle layer 12 and an inside layer 13 in contact with the seal flaps 6 which provide vapor barriers and thermal insulators for the outside layer 9. The outside layer 9 may be made of aluminized fiberglass and the middle layer 12 and inside layer 13 are made of silica fabric.

The cover 8 may include a panel 14 disposed over the seal flaps 6 and a strip 15 which extends down from the panel 14 and covers the outer edge of the wear pads 4. The strip 15 is permanently attached to the panel 14. The belt loops 33 are permanently attached to and extending up from the panel 14. The second tensioner 10 may include a tape 17 having ends, belt buckles 18, and tension springs 19, as shown in FIGS. 7A and 7B. Each end of the tape 17 is attached to one of the belt buckles 18, and one of the tension springs 19 is attached to one of the belt buckles 18 which abut to form a complete circle that holds the cover 8 down onto the seal flaps 6 about the mounting ring 3.

The panel 14 may have a clamping side 20 which is attached to the mounting ring 3 with clamping plates, as shown in FIG. 3. Each seal flap 6 may be comprised of a mounting edge for mounting to the ring 3, sealing edge, a first and second mounting ring 3 slotted mounting hole adjacent the mounting side, neither of which are round, carbon wear pad 4 mounting holes adjacent the sealing edge, a leaf overlapping slotted hole, an exposed side 28 and an interior side 25.

The present invention pertains to a method for forming a rotary seal apparatus 1 for a rotating drum 2. The method comprises the steps of placing a cover 8 over seal flaps 6 and an exposed side 5 of the wear pads 4. The mounting ring 3. The wear pads 4 are attached to the seal flaps having a wear side and an exposed side 5. The seal flaps 6 are attached to the ring 3. There are eye nuts 16 extending upwards from the seal flaps 6 and from the wear pads 4. There is the step of positioning a first tensioner 7 extending through the eye nuts 16 about the drum 2.

Figure 8:
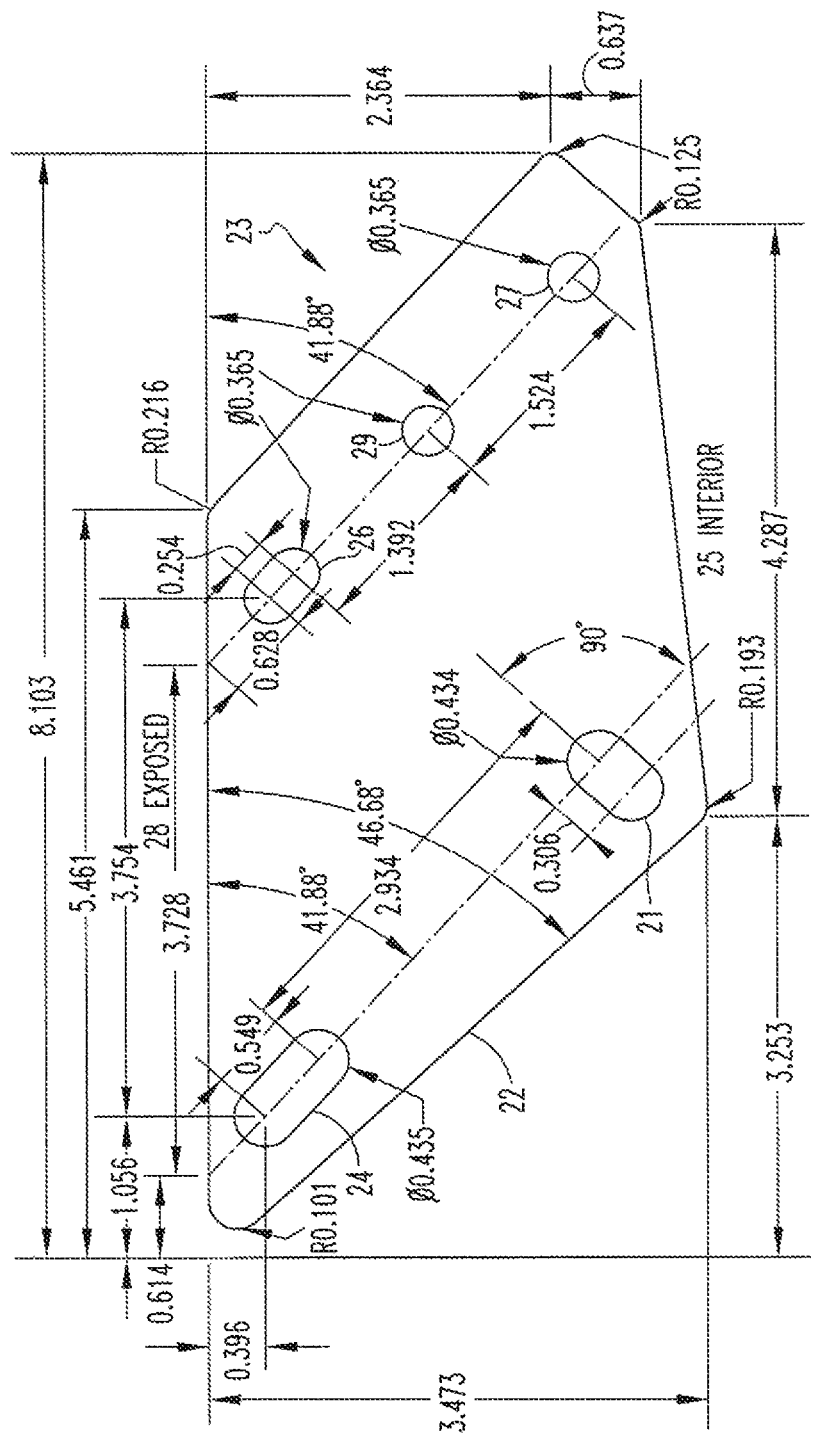
FIG. 8 is a representation of a perspective view of a seal flap of the present invention.

In the operation of the invention, by slotting hole 21, as shown in FIG. 8, the seal flap 6 accommodates a much wider range of tangential angles between the sealing surface and mounting edge as compared to the hole 21 not being slotted. Although the seal flaps 6 are fixed in design with the mounting edge 22 tapering in relation to the sealing edge 23, the slotted hole 21 will accommodate the tangential angle differences due to diameter variation. The combination of the front slotted hole 21 and the rear slotted hole 24 allows a seal flap 6 of a given size to be used on a much greater range of drum diameters without the risk of the interior edge 25 bulging and causing the apparatus 1 to lose efficiency.

The seal flap 6 comprises a mounting edge 22 with a length range of 1" to 25", sealing edge 23 with a length range of 1" to 25", mounting ring 3 slotted mounting holes 21 with a diameter range of 0.25" to 0.75" and slot length range of 0" to 1" and 24 with a diameter range of 0.25" to 0.75" and slot length range of 0" to 1", carbon wear pad mounting holes 29 with a diameter range of 0.25" to 0.75" and 27 with a diameter range of 0.25" to 0.75", leaf overlapping slotted hole 26 with a diameter range of 0.25" to 0.75" and a slot length range of 0" to 1", exposed side 28 with a length range of 1" to 25", and interior side 25 with a length range of 1" to 25".

The original design of the seal flap 6 used 2 holes for mounting the flap to the mounting ring 3. Hole 21 was round and was used as an absolute mounting point for the flap relative to the sealing surface. If a line were drawn through the slotted hole 24 and hole 21, this line would have been parallel to the mounting edge 22.

Hole 24 was slotted to accommodate a varying chord length of mounting studs due to the varying diameters that the apparatus 1 needed to conform to. Since the length of the wear pads 4 are fixed in nature, it will take a varying number of pads to fully cover a given diameter. For example, a wear pad has an absolute length of 2.937". The diameter of a drum that needs to be sealed is 36", having a circumference of 113.09". This circumference will require 38 wear pads 4 to accommodate the circumference. Should the diameter increase to 37", then 39 wear pads 4 would be necessary. Hole 24 is slotted 0.549" to accommodate the differences in chord length of the mounting studs which pass through hole 24. As more or fewer segments are needed, the slot in hole 24 easily allows the mounting studs to pass through the seal flap 6.

A line drawn through holes (29, 27, 26) reveal a parallel relationship with sealing edge 23. The previous design yielded a 5-degree difference between the edges 22 and 23, and thus the hole alignment between (21, 24) and (29, 27, 26). This offset was to accommodate a sweeping seal flap 6 design that would allow materials being processed within the system to more easily roll off and away from the seal flaps 6 rather than becoming lodged between the seal flaps 6 due to a perpendicular edge relative to the rotation of the drum being sealed. To satisfy the 5-degree offset of the mounting edge 22 and sealing edge 23, only a 3-foot diameter sealing surface where the sealing edge 23 rides would result in a 5-degree tangential offset on the mounting ring 3 diameter where mounting edge 22 of the seal flap 6 is affixed. If this offset is smaller than 5 degrees, as with much larger diameters, then the seal flaps 6 will not rest flatly on each other as they overlap.

Slotting hole 21 alleviates this restriction. As the diameter of the sealing surface increases, the tangential offset between the rotating drum and the diameter of the mounting surface is reduced. Hole 21 is slotted 0.306" in a perpendicular direction to sealing edge 23, such that if a line is drawn from the center of hole 24 through the bottom center of slotted hole 21, the line drawn will be in parallel with sealing edge 23, and thus parallel with holes 29, 27, 26). The parallel hole arrangement allows the overlapping seal flaps 6 to now rest flatly when used for drum diameters of 3 feet, up to 50+ feet.

This invention involves replacing the heavy sintered metal wear shoes with lightweight hard compressed carbon wear pads 4 comprised of 100% graphite. The lightweight pad greatly reduces the tension required to hold up the bottom of the wear pads 4 to the bottom of the drum to make contact for a seal. The reduced tension also reduces how much downforce the top and sides of the wear pads 4 are exposed to. The combination of reduced tension and 100% graphite composition of the wear pads 4 have been shown to extend service life by over 40% in tests. 100% graphite is self-lubricating which also contributes to the extended service life.

In this invention, although the bottom sealing edgy 30 of the 100% graphite pad is contoured to fit the curvature of the drum's sealing surface, the top edge 31 of the wear pad 4 is flat, as shown in FIGS. 10, 11 and 12. This is different than the sintered, wear shoes which have both a curved upper and lower face. The flat profile of the top 31 of the 100% carbon wear pad 4 reduces the flexure stress within the seal flaps 6 by allowing the seal flaps 6 to relax onto the top of the wear pad 4 rather than being forced to conform to the arc of a sintered wear shoe that is perpendicular to the arc created in the seal flap 6 by the annular mounting ring 3.

This invention includes the addition of a cover 8, as shown in FIGS. 5 and 6, which encapsulates not only the overlapping seal flaps 6, but also the exposed edge 5 of the wear pads 4. The cover 8 is of a long belt in nature, and wraps 360 degrees around the seal flaps 6 to cover them in their entirety about the drum. The cover 8 is held tightly in place along one edge by the annular mounting ring 3 which also holds the seal flaps 6 in place through holes 21 and 24. The cover 8 passes over the eye nuts 16 and down to contact the seal flaps 6. This is accomplished by the eye nuts 16 passing through small slits 11 in the cover 8 that allow the eye nuts 16 to be exposed on the outside of the cover 8. The cover 8 has a front lip 15 that is perpendicular to the panel 14 of the cover 8 itself. This lip 15 extends down over the front edge of where the wear pads 4 are located and contacts the rotating drum 2 sealing surface. The lip 15 is of sufficient width as to cover the full thickness of the wear pad 4 exposed edge 5. Belt loops 33 are affixed to the outside sealing surface of the cover 8 as to accommodate a tension device (comprised of an assembly of soft flexible straps 17, buckles 18, and extension springs 19) which keeps the cover 8 in 360 degree contact with the seal flaps 6 and the rotating drum 2 sealing surface, as shown in FIGS. 7A and 7B. It is expected that the sealing lip 15 of the cover 8 will wear at a faster rate than the 100% carbon wear pads 4. At some point, the thickness of the scaling lip 15 of the cover 8 will be equal to the 100% carbon wear pads 4 which will result in an equal wear rate of both as the wear pads 4 will support the cover 8 sealing lip 15.

Fabric Cover Description

The fabric cover 8, as shown in FIGS. 5 and 6, comprises a flat panel 14 having an outside layer 9 and an inside layer 13, a narrow strip 15 attached perpendicular to the flat panel 14 having an outside edge 32 and a clamping edge 20, and belt loops 33 attached along the edge of the outside layer 9 above the narrow strip 15.

The composition of the flat panel 14 is typically assembled with multiple layers of fiberglass or silica cloth which comprise the inside layer 13, and an aluminized fiberglass or silica cloth which comprise the outside layer 9 in its entirety. Specific composition of the flat panel 14 is dictated by environmental inputs such as temperature and chemical vapors that the flat panel 14 may be exposed to from the inside layer 13, and dictated by weather factors such as rain, UV rays, or extreme cold that the outside layer 9 may be exposed to. Materials of construction of the flat panel 14 could include but is not limited to: silica textiles, glass textiles, aluminized silica or glass textiles, silicone coated silica or glass textiles, urethane coated silica or glass textiles, vermiculite coated silica or glass textiles.

The composition of the narrow strip 15 is typically assembled with multiple layers of fiberglass or silica tape which comprise the narrow strip 15 in its entirety including the outside edge 34 and inside edge 35. Specific composition of the narrow strip 15 is dictated by environmental inputs such as temperature and chemical vapors that the narrow strip 15 may be exposed to from the inside edge 35. Materials of construction of the narrow strip 15 could include but is not limited to: silica textiles, glass textiles, graphite packings, vermiculite coated packings, Teflon tape.

The composition of the belt loops 33 is typically an aluminized fiberglass tape. Material of construction is dictated by weather factors such as rain, UV rays, or extreme cold that the belt loops 33 may be exposed to. Specific materials of construction of the belt loops 33 could include but is not limited to: aluminized glass, Teflon, silicone coated glass, rubber, Kevlar, Nomex.

Dimensions for the cover 8 assembly are strictly dictated by the size of the apparatus 1 for which it is covering. The size of the apparatus 1 is strictly dictated by the size of the process for which it is sealing. Four widths of flat panels 14 that are typically used along the outer surface 9 include four inches, eight inches, twelve inches, and fourteen inches. The flat panel 14 could be comprised of other widths should a non-typical width apparatus 1 be necessary.

The width of the narrow strip 15 is strictly dictated by the thickness of the carbon wear pad 4 that it is sealing. Typically, the narrow strip 15 is one inch wide and covers the 0.75-inch-thick carbon wear pad 4 in its entirety.

The overall length of the cover assembly, which is comprised of the flat panel 14, the narrow strip 15, and belt loops 33, is strictly dictated by the circumference of the rotating drum 2. Sufficient cover 8 length is required as to cover the apparatus 1 about 360 degrees of its sealing area, and provide sufficient overlap, typically 15% of total circumference of the rotating drum 2, such that the cover 8 overlaps when installed as to eliminate the chance for an open gap at the abutment area of the cover 8. For instance, a 100-inch rotating drum 2 circumference would require a 115-inch-long cover 8 to effectively cover 360 degrees of apparatus 1, and provide fifteen inches of overlap.

The cover 8 assembly is mounted over the seal flaps 6 by clamping side 20 in place under the clamping area plates beginning at the 12 o'clock position of the system. Small slices are cut into the clamping side 20 of the cover 8 to allow the OD of the cover 8 to expand under the clamping area segments, which in turn allows the ID of the cover 8, the narrow strip 15 sealing edge to relax onto the sealing surface of the rotating drum 2. Small slits 11 are cut into the cover 8 to allow the eye nuts 16 to pass through the slits 11. This allows the cover 8 to relax down onto the surface of the seal flaps 6. Repeat this process down both sides of the rotating drum 2 until the 6 o'clock position is reached, Here is where the cover 8 is overlapped over itself. Once the cover 8 is completely clamped into position by the clamping area segments, a tension device is assembled.

The tension device consists of a tape 17, typically comprised of Kevlar, belt buckles 18, typically comprised of stainless steel, and extension springs 19 typically comprised of stainless steel. The end of the tape 17 is laced through the belt buckle 18. This is typically done at both ends of a fixed length of tape 17. Once sufficient segments are affixed with belt buckles 18, the segments are put through the belt loops 33 of the cover 8. Tension springs 19 are affixed to abutting belt buckles 18 to form a complete 360-degree circle that holds the cover 8 down onto the surface of the seal flaps 6.

The cover 8 restricts gaseous fluids and dust particles from passing through small open gaps between the seal flaps 6, and through the open gaps between abutting carbon wear pads 4. The narrow strip 15 is expected to wear significantly when compared to the wear rate of the carbon wear pads 4. Once the width of the narrow strip 15 is of like dimension of the thickness of the carbon wear pad 4, the wear rate will equalize between the narrow strip 15 and carbon wear pad 4.

The cover 8 that has been produced was manufactured per the following materials and methods:

Material Preparation:

1 piece of 0.026" thick ALPHA-MARITEX 2025/9480 aluminum hacked woven fiberglass cloth available from Alpha Associates, Inc. was cut into a strip 5" wide×17LF long 9

1 piece of 0.040" thick AMI-SIL AS2400 woven silica fabric available from Auburn Manufacturing was cut into a strip 10" wide by 17LF long 12, 13

6 pieces of 1" wide×0.090" thick AS90 fiberglass tape available from Auburn Manufacturing way; cut into 17LF strips 15, 34, 35

25 pieces of 1" wide×0.0062" thick Nor-Fab N22P400 Series fiberglass tape available from Nor-Fab was cut into 3.75" strips 33

30/4 Tex 70 Spun Thread of Kevlar Brand Fiber SK100 available from Komar Alliance Assembly:

The woven silica fabric 12, 13 was folded in half to make a piece 5" wide×17LF long. The piece of aluminum backed woven fiberglass 9 was placed, with aluminum side of fabric exposed, on top of the woven silica fabric 12, 13 to form a 3 layer thick flat panel 14. Kevlar wrapped stainless steel thread was used to sew the 3 layers together along the edges of the length of the flat panel 14 in positions 36 and 37.

Belt loops 33 made from fiberglass tape were spaced 8" apart along, the lengthwise edge 32, and 2" in from the lengthwise edge 32 on the outer surface 9 of the flat panel 14. One edge of the belt loop 33 was sewn in position 38 using Kevlar wrapped stainless steel thread. The opposite end of the belt loops 33 were not sewn at this point and left loose.

Four strips of the fiberglass tape 15 were stacked and sewn lengthwise in position 39, 0.25" from the edge of the stack with Kevlar wrapped stainless steel thread. The remaining 2 pieces of fiberglass tape were placed [one piece] on each side 34, 35 of the stacked fiberglass tape 15 and were positioned 0.50" (half the width) up on the face of the fiberglass tape stack 15. These pieces were sewn onto the fiberglass stack 15 in position 40 using Kevlar wrapped stainless steel thread.

The stacked fiberglass thin strip 15, 34, 35, collectively called the thin strip 15, was then placed onto the inner surface 13 of the flat panel 14 with side 35 being placed 1.25" in from edge 32. The loose tab of the fiberglass tape which comprises inside edge 35 was then sewn onto the inner surface 13 using Kevlar wrapped stainless steel thread in position 41.

The final step was to take the loose edge of the belt loop 33 and tuck it over edge 32 and onto the inner surface 13 such that the top of the belt loop 33 lay flat against the outer surface 9. The loose tab of the fiberglass tape was matched up with edge 32 whereas the belt loops 33 were sandwiched between the inner surface 13 and the fiberglass tape of outside edge 34. These pieces were then sewn using Kevlar wrapped stainless steel thread in position 42 along edge 32.

Characteristics:

The cover 8 can, depending on materials of construction, withstand 1800 F if using silica fabric with ceramic fiber insulation. The cover 8 as constructed above can withstand temperatures at least up to 1000 F which is the maximum temperature rating of fiberglass.

The cover 8 is designed to be just that, a cover. It will typically not be subject to any shear stress or loads other than containing a vacuum or brief positive pressure situations. The cover 8 is designed to enhance the seal flaps 6 by further restricting, air ingress through the seal flaps 6 due to negative pressure within the system that is being sealed. An induced draft (ID) fan is used to pull air and vapors through a system and is typically placed at the opposite side of the process from the burner. As the ID fan pulls air and vapors, it creates negative gauge pressure within the system which is typically 0.5-1.0 inches of water column. Higher capacity wood pellet dryers for instance, may see unusually high vacuum within the system which can approach 10 inches of water column, Since the cover 8 rests on the outer face of the seal flaps 6, it is fully supported across its total body and will easily withstand these vacuums. Also, since the cover 8 is pinned in place under the damping ring segments on one end, and held in position by a tension device 10 along the other edge, it can withstand positive pressure of 1.0 inches of water column as well.

On occasion, a positive pressure situation known as a 'puff' will develop within a system. If the system puffs, it can expose the cover 8 to corrosive or caustic gasses that develop within the system while processing certain materials. Silica fabric is inert to chemical attack from most corrosive and caustic gasses so it can withstand harsh environments that it may be exposed to. Should additional protection be needed for the cover 8, specialty materials can be layered to make the cover 8 impervious to chemical attack.

The cover 8 is comprised of flexible materials that allow it to move and bend in response to the movements of the seal flaps 6 that it is covering. Silica fabric and aluminum backed woven fiberglass are soft and flexible in nature which allow the cover 8 to be resilient under the dynamic motion of a rotating drum. The materials are also layered as they perform specific tasks in response to environmental inputs. Woven silica fabric is on the inside of the cover 8 which contacts the upper face of the seal flaps 6. This fabric will withstand more heat (up to 1800 F) than will outer layers and acts as not only a vapor barrier, but as an insulator. The exposed side 9 of the cover 8 is made of aluminum backed fiberglass which acts as an impervious vapor barrier due to the solid aluminum foil covering of the fiberglass. Fiberglass is rated to 1000 F and is insulated from potentially higher temperatures by the silica fabric on the interior of the cover 8. The aluminum backing of the fiberglass layer also acts as a weather shield so the cover 8 can be effective when exposed to rant and UV rays from the sun.

The outside layer 9 of aluminized fiberglass is a vapor barrier for the cover 8. The middle 12 and inside layer 13 of silica fabric are vapor and insulation barriers.

The following material could be used to produce the cover: alumina fabric, glass fabric, aramid fabric, basalt fabric, metallic fabric, nylon fabric, polyester fabric, ceramic fabric.

All of these listed materials can be covered or impregnated by the following materials: vermiculite, wire, aluminum, rubber, PTFE.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A rotary seal apparatus for a rotating drum comprising:
a mounting ring;
seal flaps attached to the mounting ring;
wear pads attached to the seal flaps having a wear side and an exposed side;
eye nuts extending upwards from the seal flaps and from the wear pads;
a first tensioner extending through the eye nuts;
a cover that is disposed over the seal flaps and the exposed side of the wear pads and encapsulates the seal flaps and the exposed side of the wear pads, the cover wraps 360 degrees around the seal flaps to cover them in their entirety around the rotating drum, the cover has belt loop guides disposed on the cover's outer surface; and
a second tensioner that extends through the belt loop guides to hold the cover in place against the seal flaps all around the rotating drum, the cover is flexible so the cover can bend and includes a panel formed of multiple layers, the multiple layers of the panel comprise an outside layer which provides a vapor barrier for the cover, a middle layer and an inside layer in contact with the seal flaps which provide vapor barriers and thermal insulators for the outside layer, the outside layer and the middle layer and the inside layer attached together along their length, the panel disposed over the seal flaps, the cover includes a sealing lip which extends perpendicularly down from the panel and covers a full thickness of the outer exposed side of the wear pads and contacts the drum, the sealing lip permanently attached to the panel, the belt loop guides permanently attached to and extending up from the panel, the panel has a clamping side which is attached to the mounting ring with clamping plates, slices are cut into the clamping side to allow an outside diameter of the panel to expand under the clamping plates which in turn allows an inside diameter of the panel and a sealing edge of a strip to relax onto a sealing surface of the rotating drum, the cover containing a vacuum or withstanding positive pressure of 10 inches of water column.

2. The apparatus of claim 1 wherein the cover has slits through which the eye nuts extend.

3. The apparatus of claim 2 wherein the wear pads are made of 100% carbon/graphite.

4. The apparatus of claim 3 wherein the cover withstands temperatures of at least 1000 degrees F.

5. The apparatus of claim 4 wherein the outside layer is made of aluminized fiberglass, and the middle layer and inside layer are made of silica fabric.

6. The apparatus of claim 5 wherein the second tensioner includes a tape having ends, belt buckles, and tension springs, each end of the tape is attached to one of the belt buckles, and one of the tension springs is attached to one of the belt buckles which abut to form a complete circle that holds the cover down onto the seal flaps about the mounting ring.

7. The apparatus of claim 6 wherein each seal flap comprises a mounting edge for mounting to the mounting ring, sealing edge, a first and second mounting ring perpendicularly slotted mounting hole adjacent a mounting side, neither of which are round, carbon wear pad mounting holes adjacent a sealing side, a leaf overlapping slotted hole, an exposed side, and an interior side.

8. A method for forming a rotary seal apparatus for a rotating drum comprising the steps of:
placing a cover over seal flaps and an exposed side of wear pads which encapsulates the seal flaps and the exposed side of the wear pads, the cover wraps 360 degrees around the seal flaps to cover them in their entirety around the rotating drum, the cover has belt loop guides disposed on the cover's outer surface, the seal flaps attached to a mounting ring, the wear pads attached to the seal flaps having a wear side and an exposed side, and eye nuts extending upwards from the seal flaps and from the wear pads, the cover is flexible so the cover can bend and includes multiple layers, an outside layer which provides a vapor barrier for the cover, a middle layer and an inside layer in contact with the seal flaps which provide vapor barriers and thermal insulators for the outside layer, the outside layer and the middle layer and the inside layer attached together along their length along their edges; and
positioning a first tensioner extending through the eye nuts.

9. A rotary seal apparatus for a rotating drum comprising:
a mounting ring;
plate seal flaps attached to the mounting ring, each of the plate seal flaps have a first elongate slot and a second elongate slot which are perpendicularly oriented that are used to attach the seal flaps to the mounting ring;
wear pads attached to the seal flaps;
eye nuts extending upwards from the seal flaps and from the wear pads; and
a first tensioner extending through the eye nuts.

* * * * *